United States Patent
Turner

(10) Patent No.: US 7,054,665 B2
(45) Date of Patent: May 30, 2006

(54) BILLING RECORDS ENHANCED BY CALLED PARTY NAMES FROM SUBSCRIBER PHONE BOOK

(75) Inventor: Neil Turner, Swindon (GB)

(73) Assignee: Motorola, Inc., Schaumburg, IL (US)

( * ) Notice: Subject to any disclaimer, the term of this patent is extended or adjusted under 35 U.S.C. 154(b) by 53 days.

(21) Appl. No.: 10/489,068

(22) PCT Filed: Apr. 29, 2002

(86) PCT No.: PCT/EP02/04857

§ 371 (c)(1),
(2), (4) Date: Mar. 9, 2004

(87) PCT Pub. No.: WO03/026266

PCT Pub. Date: Mar. 27, 2003

(65) Prior Publication Data

US 2004/0242262 A1 Dec. 2, 2004

(30) Foreign Application Priority Data

Sep. 15, 2001 (GB) .................................. 0122356

(51) Int. Cl.
*H04B 1/38* (2006.01)
*H04M 1/00* (2006.01)
*H04M 11/00* (2006.01)

(52) U.S. Cl. ...................... 455/565; 455/405; 455/406; 455/407; 455/408

(58) Field of Classification Search ................ 455/405, 455/406, 407, 408, 550.1, 565
See application file for complete search history.

(56) References Cited

U.S. PATENT DOCUMENTS

| | | | |
|---|---|---|---|
| 5,835,856 A | | 11/1998 | Patel |
| 6,047,051 A | * | 4/2000 | Ginzboorg et al. ......... 379/130 |
| 6,067,529 A | * | 5/2000 | Ray et al. ...................... 705/26 |
| 6,226,364 B1 | * | 5/2001 | O'Neil .................... 379/114.2 |
| 6,278,874 B1 | * | 8/2001 | Verdonk ...................... 455/408 |
| 6,381,468 B1 | * | 4/2002 | Larsen et al. ............. 455/550.1 |
| 6,553,217 B1 | * | 4/2003 | Kundorf ..................... 455/406 |
| 6,701,151 B1 | * | 3/2004 | Diachina et al. ......... 455/452.1 |
| 6,871,082 B1 | * | 3/2005 | Cox et al. .................... 455/565 |
| 2001/0017915 A1 | | 8/2001 | Wardin et al. |
| 2001/0039197 A1 | * | 11/2001 | Barkan ....................... 455/561 |
| 2001/0051534 A1 | * | 12/2001 | Amin ......................... 455/565 |

* cited by examiner

*Primary Examiner*—George Eng
*Assistant Examiner*—Un C. Cho
(74) *Attorney, Agent, or Firm*—Lalita W. Pace; Brian M. Mancini

(57) ABSTRACT

This invention relates to a cellular communication system (200), billing processor (223) and method of billing. The communication system includes a subscriber unit (201) having a user updateable identity to phone number association table used for dialling phone numbers based on an identity such as a name. It also includes means (203, 205,219,217) for communicating the table to a billing processor (223) being part of the fixed network. The billing processor (223) comprises means (227) for receiving the table and generating a billing association table containing information from the identity to phone number association table. It furthermore comprises a billing report generator (225) for generating a billing report for the subscriber unit (201) including identity information derived from the billing association table. The invention is applicable to cellular communication systems such as UMTS.

12 Claims, 2 Drawing Sheets

-PRIOR ART-

US 7,054,665 B2

BILLING RECORDS ENHANCED BY CALLED PARTY NAMES FROM SUBSCRIBER PHONE BOOK

This application is a 371 of PCT/EP02/04857 Apr. 29, 2002.

FIELD OF THE INVENTION

This invention relates to a cellular communication system, a billing processor and method of billing therefor.

BACKGROUND OF THE INVENTION

In a cellular communication system, such as the Global System for Mobile communication (GSM), each of the subscriber units (typically mobile stations) communicates with typically a fixed base station. Communication from the subscriber unit to the base station is known as uplink and communication from the base station to the subscriber unit is known as downlink. The total coverage area of the system is divided into a number of separate cells, each predominantly covered by a single base station. The cells are typically geographically distinct with an overlapping coverage area with neighbouring cells. FIG. 1 illustrates a cellular communication system 100. In the system, a base station 101 communicates with a number of subscriber units 103 over radio channels 105. In the cellular system, the base station 101 covers users within a certain geographical area 107, whereas other geographical areas 109, 111 are covered by other base stations 113, 115. Some overlap areas 117 can be covered by more than one cell.

As a subscriber unit moves from the coverage area of one cell to the coverage area of another cell, the communication link will change from being between the subscriber unit and the base station of the first cell, to being between the subscriber unit and the base station of the second cell. This is known as a handover. Specifically, some cells may lie completely within the coverage of other larger cells.

All base stations are interconnected by a fixed network. This fixed network comprises communication lines, switches, interfaces to other communication networks and various controllers required for operating the network. A call from a subscriber unit is routed through the fixed network to the destination specific for this call. If the call is between two subscriber units of the same communication system the call will be routed through the fixed network to the base station of the cell in which the other subscriber unit currently is. A connection is thus established between the two serving cells through the fixed network. Alternatively, if the call is between a subscriber unit and a telephone connected to the Public Switched Telephone Network (PSTN) the call is routed from the serving base station to the interface between the cellular mobile communication system and the PSTN. It is then routed from the interface to the telephone by the PSTN.

Users of subscriber units such as mobile phones, mobile terminals, user equipment etc. typically either pay for their calls in advance (known as pre-paid) or are billed at regular intervals, typically on a monthly basis. The monthly charges typically comprise a line rental paid in advance as well as call charges for any calls made in the previous month. The subscriber is provided with an itemised bill or invoice showing the duration, cost and phone number for each call made. The subscriber may for example use this information to check the accuracy of the invoice, verify that no unauthorised calls have been made or categorise the charges for example into private and business calls.

A problem with conventional invoices or bills is that it is time consuming for the subscriber to identify calls made from the information provided. Most people find it difficult to remember phone numbers and therefore checking an itemised invoice becomes very cumbersome and time consuming. There is therefore a need for a billing system providing improved information to the subscriber.

SUMMARY OF THE INVENTION

The inventors of the current invention have realised that conventional billing approaches are suboptimal for providing information to the subscriber and the invention seeks to provide an improved billing system offering improved information to the subscriber.

In accordance with a first aspect of the present invention, there is provided a cellular communication system as claimed in claim 1

In accordance with a second aspect of the present invention, there is provided method of billing in a cellular communication system as claimed in claim 7.

In accordance with a third aspect of the present invention, there is provided a billing processor as claimed in claim 10.

Further aspects of the invention are as defined in the dependent claims.

BRIEF DESCRIPTION OF THE DRAWINGS

An embodiment of the present invention is described below, by way of example only, with reference to the Drawings, in which.

DETAILED DESCRIPTION OF A PREFERRED EMBODIMENT

The following description focuses on an embodiment compliant with a GSM cellular communication network but it will be apparent that the invention is not limited to this application. For example, the invention is equally applicable to a UMTS or other Third Generation communication system.

Figure 1:
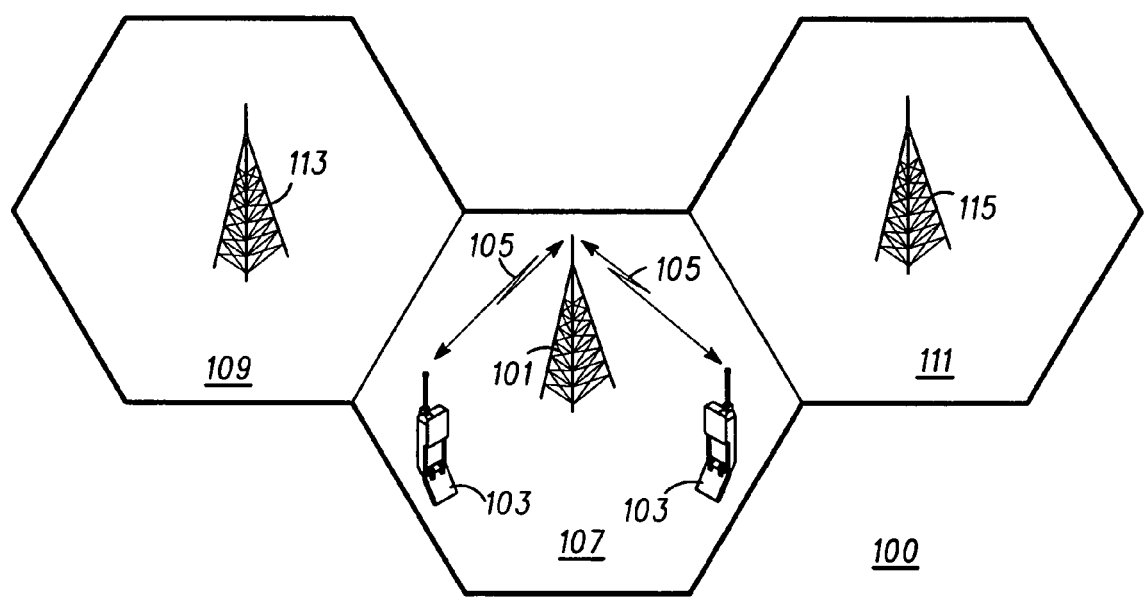
FIG. 1 is an illustration of a cellular communication system according to prior art.
Figure 2:
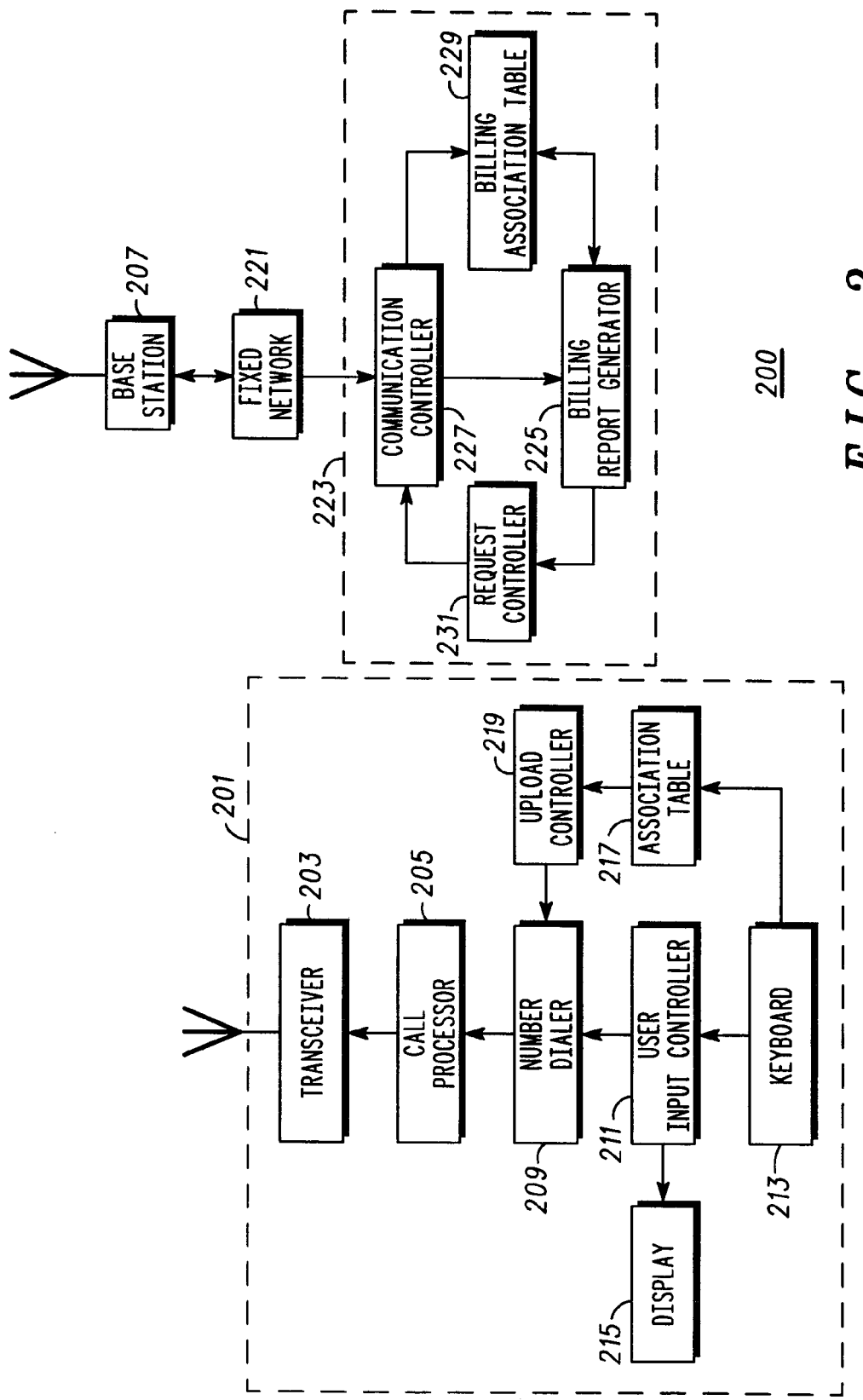
FIG. 2 is an illustration of a cellular communication system in accordance with an embodiment of the invention

FIG. 2 is an illustration of a cellular communication system 200 in accordance with an embodiment of the invention.

A subscriber unit 201 comprises a transceiver 203 for transmitting and receiving signals as is well known in the art. The subscriber unit 201 also comprises a call processor 205, which together with the transceiver 203 is operable to perform all functions required for the subscriber unit 201 to communicate with a base station 207 according to the specification and protocols of the cellular communication system. These functions include transcoding (for voice calls), control functions, measurement reporting and any other necessary or desired function of the subscriber unit.

The subscriber unit 201 further comprises a number dialler 209 which is operable to control the call processor 205 to access the communication system so as to establish a connection to the desired destination. In the specific embodiment of a GSM system, the number dialler will control the call processor to initiate a RACH (Random Access CHannel) message which will instigate a call setup procedure between the subscriber unit and the fixed network during which the number information will be communicated to the fixed network, and a connection to the corresponding destination is set-up. Details of this call setup procedure can be found in e.g. 'The GSM System for Mobile Communications' by Michel Mouly, Marie-Bernadette Pautet, Telecom Publishing 1992, ISBN 0945592159.

The number dialler 209 is connected to a user input controller 211 and a keyboard 213. The input controller 211 interfaces between the number dialler 209 and the keyboard 213. When a number is dialled on the keyboard 213 it is read and interpreted by the user input controller 211 and upon completion and activation of a send button it is fed to the number dialler 209 which then instigates the call setup procedure of the call processor 205. The user input controller 211 is also connected to a display 215 thereby controlling both the reading of the user input device (the keyboard) and the user output device (the display).

In addition the user input controller 211 is connected to an identity to phone number association table memory 217. This memory comprises information relating identity information to phone numbers. In the simplest form the information is in form of a conventional table where there is a direct one to one correspondence between a telephone and an identity record. However, it is within the contemplation of the invention that any suitable association rule, protocol or data base structure can be used including multi-dimensional tables, context dependent associations, or any other dynamic or static method of relating one or more phone numbers to one or more identity data records.

According to the preferred embodiment the user will be able to enter a telephone number and associated identity information to be stored in the identity to phone number association table. It is well known from mobile phones, that a telephone number can be entered together with a name for storage in the mobile phones internal memory or in a removable SIM card. The telephone number and associated identity information (in this case the name) is stored in the subscriber unit in the identity to phone number association table memory 217. The identity to phone number association table memory 217 can be an integral part of the subscriber unit or can be a removable medium, such as e.g. a smart card.

It is known from conventional mobile phones, that the user can enter a name which is then used to access an association table memory to determine a corresponding phone number which is then called. However, the information is personalised by the individual user and is local to the subscriber unit.

In accordance with the preferred embodiment of the invention, the subscriber unit 201 further comprises an upload controller 219 in this example connected to the association table memory 217 and to the call processor 205. The upload controller 219 is operable to control the call processor 205 to transmit the identity to phone number association table to the base station 207. The upload controller 219 reads the information in the association table memory 217 and passes this in an appropriate format to the call processor 205. The call processor 205 formats and processes the data in accordance with the protocols and specifications of the GSM system before the association data table data is transmitted over the air interface by the transceiver. It may further compress the data prior to upload.

In the preferred embodiment, the communication of the association table data is by use of standardised GSM data transmission services such as General Packet Radio Service (GPRS). However, it is within the contemplation of the invention that any suitable method of communicating this system to the fixed network may be used including using Short Message Services (SMS) or dedicated channels or messages.

The association table data is received by the base station 207 and passed on to the fixed network 221, which forwards the data to a billing processor 223. The billing processor 223 is responsible for generating billing reports for a number of users depending on their usage and the terms of the agreement between the user and the network operator. Typically, the billing report generated comprises a fixed monthly subscriber fee and a variable charge dependent on the extent, nature and time of the calls made. The billing processor 223 thus comprises a billing report generator 225 which generates a report per user listing all or a subset of calls made. Preferably the billing report will contain an identification of the called party dialled together with the cost, time and duration of each individual call As shown in FIG. 2, the billing processor 223 comprises a communication controller 227 connected to the fixed network 221. The communication controller 227 is connected to the billing report generator 225 and receives information relating to calls from the fixed network 221, which it forwards to the billing report generator 225. This information includes phone numbers called, durations of calls, times of calls and any other information relevant and/or necessary for billing users. The billing report generator 225 stores the information and when requested by the operator or at predetermined times generates the billing report based on the information.

In addition the communication controller 227 is operable to receive other information from the fixed network including for example control messages, fault conditions etc. Specifically, in accordance with the preferred embodiment, the communication controller 227 is operable to receive the identity to phone association table data transmitted by the subscriber unit 201. In the preferred embodiment, the communication controller 227 will receive this through the intermediate elements of the base station 207 and the fixed network 221. However, in other embodiments the association table data may be transmitted through other means, such as a direct radio or wire connection, or the data may be stored or manipulated in other elements of the communication system.

The billing processor 223 further comprises billing association table memory 229 for storing a billing association table. The billing association table is derived from the phone number association table and in its simplest form is identical to this. More generally, the billing association table is derived from the phone number association table such that the identity information related to a phone number in identity to phone number association table can be retrieved from the billing association table in response to the phone number.

The communication controller 227 comprises means for receiving the phone association table and generate a billing association table therefrom. It furthermore comprises means for loading the billing association table into the billing association table memory 229.

The billing report generator 225 is connected to the billing association table memory 229. In generating the billing report the billing report generator 225 will access the billing association memory 229 for each or a subset of all calls reported and determine if the billing association table comprises any identity information for the relevant phone number for that call. If the billing association table comprises an appropriate entry, the billing report generator 225 will include the corresponding identity information in the billing report. In the preferred embodiment, the identity information will be added to the current information such that for each call the corresponding identity information is displayed. together with the phone number called, the duration of the call, the time of the call and the cost of the call. In other embodiments the phone number may for example be entirely replaced by the identity information.

In its simplest form identity to phone number association table simply comprises one identity record for each phone number so that there is a one to one correspondence between the phone number and the identity information. In the subscriber unit the identity to phone number association table is accessed based on identity information and the corresponding telephone number is derived. In one embodiment of the invention, the billing association table may be identical to the identity to phone number association table. The billing report generator will access the billing association number by searching the available records until the phone number is found and the corresponding identity record retrieved. In other embodiments, more complex structures of the identity to phone number association table may be used and consequently more advanced access structures used. For example, the phone number association table may not have a one to one correspondence between phone numbers but may e.g. have several possible identity records linked to a given phone number. In this case the billing association table is always fully searched and all corresponding identity records retrieved and included in the billing report.

In a more complex embodiment, the billing association table is derived from the identity to phone number association table to allow the corresponding identity information to be easily retrieved in response to a phone number. In a simple form this may comprise sorting the records in response to the phone number information such that the table can be easily accessed by a direct access or a simplified search. In more complex embodiments, this derivation may include modifying and reordering data records as well as the links between these, such that an inverse of the original identity to phone number association table is derived.

In addition, the billing association table will in more complex embodiments not only comprise information derived from the phone number association table but will also include extra information which can be added by the billing processor 223. Such information may include directory information centrally stored in the network. This would enable an automatic identification of phone numbers not contained in the identity to phone number association table received from the subscriber. An example of such directory information is an association of a specific phone number to the corresponding company. Rather than contain all available directory information, the billing association table will in the preferred embodiment include records corresponding to frequently called phone numbers for that particular user. Thus as an example, if a user frequently phones 01793 541 541, the billing processor will instigate a look up of this phone number in an appropriate data base and derive the corresponding identity of "Motorola, UK". It will include this information in the billing association table and this information will consequently be included in the billing report.

It will be clear to the person skilled in the art that any suitable structure or organisation of the billing association table as well as any suitable access or retrieval technique may be applied without detracting from the invention.

In the preferred embodiment the identity to phone number association table is transmitted from the subscriber unit whenever the user makes a modification to the table. The transmission may either be of the entire phone number association table or may only comprise the modifications made. When receiving the transmission the communication controller 227 updates the billing association table accordingly. In a more complex embodiment, the billing processor 223 further comprises a request controller 231, which is operable to request the transmission of the identity to phone number association table from the subscriber unit 201. The request controller is connected to the billing report generator 225, and prior to the billing report generator generating a billing report for a specific user, it transmits a notification to the request controller 231. The request controller 231 is connected to the communication controller 227 and through this, the fixed network 221 and the base station 207 a request message is transmitted to the subscriber unit 201. Upon receiving the request message, the subscriber unit 201 transmits the current identity to phone number association table back to the billing processor which incorporates the updated information in the billing association table before generating the billing report. In this embodiment, it is thus ensured that the generated billing report comprises the updated information contained in the users phone number association table.

The billing processor may be implemented in any suitable manner to provide a suitable apparatus. The module may consist of a single discrete entity added to a network, or may alternatively be formed by adapting existing parts of network elements, for example by reprogramming of one or more processors therein. As such the required adaptation may be implemented in the form of processor-implementable instructions stored on a storage medium, such as a floppy disk, hard disk, PROM, RAM or any combination of these or other storage media. Furthermore, whether a separate entity or an adaptation of existing parts or a combination of these, the billing processor may be implemented in the form of hardware, firmware, software, or any combination of these. Also the billing processor may be implemented as a centralised elements or the functions may be distributed over two or more elements including other network elements, such as for example a base station or a network switching unit It will be apparent to the person skilled in the art that the phone number referred to need not be a conventional phone number as used in a land line telephone system but may be other suitable method of addressing or identifying a destination of the call, including for example an Internet Protocol (IP) number or address.

It will be understood that the invention tends to provide the following advantages singly or in any combination:
  the billing report can incorporate identity information thereby increasing the readability to the average user.
  the identity information used is personalised and specific to the individual user.
  the identity information is automatically updated.
  no extra effort is required by the user in order to setup or update a billing association table.

The invention claimed is:
1. A cellular communication system comprising:
  a subscriber unit having:
    memory comprising a user-updateable callee identity-to-phone-number association table having a callee identity associated with a phone number to be called;
    dialing means for dialing the phone number;

means for communicating the identity-to-phone-number association table from the subscriber unit to a billing processor, and the billing processor comprising:

means for receiving the callee identity-to-phone-number association table from the subscriber unit;

means for generating a billing association table comprising information from the received identity-to-phone-number association table;

means for associating identity information with at least one callee by deriving an identity corresponding to a called phone number from the billing association table; and means for generating a billing report for the subscriber unit including identity information related to a callee.

2. A cellular communication system as claimed in claim 1 wherein means for communicating comprises means in the subscriber unit for transmitting the identity to phone number association table using a GPRS data call.

3. A cellular communication system as claimed in claim 1 wherein means for communicating comprises means in the subscriber unit for transmitting the identity to phone number association table using an SMS call.

4. A cellular communication system as claimed in claim 1 wherein the subscriber unit comprises instigating means for instigating the communication of the identity to phone number association table from the subscriber unit to the billing processor when the identity to phone number association table is updated by the user.

5. A cellular communication system as claimed in claim 1 further comprising means for replacing the phone number with the associated identity information derived from the billing association table such that the billing report contains identity information instead of the phone number for the at least one call.

6. A cellular communication system as claimed in claim 1 further comprising means in the billing processor for requesting the communication of the identity to phone number association table from the subscriber unit.

7. A method of billing in a cellular communication system including a subscriber unit having an user-updateable identity-to-phone-number association table having an identity associated with a phone number to be called and dialing means for dialing the phone number; the method comprising the steps of receiving the callee identity-to-phone-number association table from the subscriber unit;

generating a billing association table comprising information from the received identity to phone number association table;

associating identity information with at least one callee by deriving an identity corresponding to a called phone number from the billing association table; and generating a billing report for the subscriber unit including identity information related to a callee.

8. A method of billing in a cellular communication system as claimed in claim 7 further comprising the step of replacing the phone number with the associated identity information derived from the billing association table such that the billing report contains identity information instead of the phone number for the at least one call.

9. A method of billing in a cellular communication system as claimed in claim 7 further comprising the step of requesting a transmission of the identity to phone number association table from the subscriber unit.

10. A billing processor for a cellular communication system including at least one subscriber unit having a user updateable callee identity-to-phone-number association table having a callee identity associated with a phone number to be called and dialing means for dialing the phone number;

the billing processor comprising:

means for receiving the callee identity-to-phone-number association table from the subscriber unit;

means for generating a billing association table comprising information from the received identity-to-phone-number association table means for associating identity information with at least one callee by deriving an identity corresponding to a called phone number from the billing association table;

means for generating a billing report for the subscriber unit including identity information related to a callee.

11. A billing processor as claimed in claim 10 further comprising means for replacing the phone number with the associated identity information derived from the billing association table such that the billing report contains identity information instead of the phone number for the at least one call.

12. A billing processor as claimed in claim 10 further comprising means for requesting the communication of the identity to phone number association table.

* * * * *